Nov. 19, 1963 L. SINKEWITSCH 3,111,281

TAPE RECORDER

Filed April 15, 1960 4 Sheets-Sheet 1

INVENTOR:

LEONID SINKEWITSCH

BY

Michael S. Striker his ATTORNEY

TAPE RECORDER

Filed April 15, 1960 4 Sheets-Sheet 2

INVENTOR:
LEONID SINKEWITSCH

BY

Michael S. Striker
his ATTORNEY

Nov. 19, 1963 L. SINKEWITSCH 3,111,281

TAPE RECORDER

Filed April 15, 1960 4 Sheets-Sheet 3

INVENTOR:
LEONID SINKEWITSCH

BY

Michael S. Striker
his ATTORNEY

INVENTOR:
LEONID SINKEWITSCH
BY
Michael S. Striker
his ATTORNEY 3,111,281
Patented Nov. 19, 1963

3,111,281
TAPE RECORDER

Leonid Sinkewitsch, Nurnberg, Germany, assignor to Max Grundig, Bayern, Germany

Filed Apr. 15, 1960, Ser. No. 22,628
Claims priority, application Germany May 12, 1959
24 Claims. (Cl. 242—55.13)

The present invention relates to tape recorders in general, and more particularly to improvements in tape recorders utilizing a two-reel tape cartridge which is removably mounted on the tape deck.

An important object of the present invention is to provide an improved drive for the takeup and supply reels which are mounted in the cartridge of a tape recorder, the drive being constructed and connected with the reels in such a way that the reels are not subjected to axial and/or radial stresses such as would tend to tilt the reels and to cause non-uniform advance of tape therebetween.

Another object of the invention is to provide a tape recorder of the above outlined characteristics whose cartridge is provided with novel means insuring that the tape is convoluted onto both reels under identical tension and that the adjacent convolutions cannot slide with respect to each other.

A further object of the invention is to provide a tape recorder whose cartridge is constructed and assembled in such a way that the tape receiving reels are properly centered regardless of the wear upon the bearings in which the reels are mounted.

An additional object of my instant invention is to provide a drive for the reels of a tape cartridge which embodies means enabling an operator to tighten or to loosen the tape within such limits as are necessary for conveniently moving the cartridge with respect to the tape deck and for avoiding undue tensioning of tape when the recorder is put to use, i.e. when the tape comes into contact with the tape heads and guiding members utilized for bending the tape about the faces of tape heads.

A concomitant object of the invention is to provide a tape recorder of the type in which the tape is received in a two-reel cartridge and in which the cartridge is constructed in such a way that any inaccuracies in the construction and mounting of tape deflecting rollers do not reduce the accuracy with which the tape must be guided into contact with the tape heads.

Still another object of the invention is to provide a tape recorder of the above outlined characteristics in which two or more sets of tape contacting elements may be operated by a single control element, in which the tape may be utilized to complete the electric circuit of means for reversing the direction of its movement, in which a connection between the tape reels and the drive means therefor is established in a fully automatic way once the cartridge is properly placed onto the tape deck, and in which the tape guiding, tensioning, loosening and deflecting parts are mounted in a space-saving way but remain readily accessible for eventual inspection, interchange or repair.

An additional object of the invention is to provide improved tape guiding, tensioning, loosening and deflecting devices which, though preferably utilized in a tape recorder operating with cartridge tape, may be utilized in certain tape recorders which utilize reel-to-reel tape, i.e. in tape recorders in which the reels are individually mounted on the tape deck.

With the above objects in view, the invention resides in the provision of a tape recorder wherein the supply and takeup reels are rotatable by separate drives each comprising two or more entraining members which enter symmetrically arranged eccentric apertures in the reels so that the reels are subjected to pure tangential forces without any axial or radial components such as would tend to tilt or otherwise displace the reels with respect to the tape deck. In its preferred form, each drive comprises a friction clutch assembly including two rotatable components with a layer of friction material therebetween, and two parallel spring-biased entraining pins mounted in one of the components and extendable into a pair of symmetrically arranged eccentric apertures in a concentric discoid hub plate of the respective tape reel. In order to enable an operator either to loosen or to tension the tape portion extending between the tape reels, one component of at least one aforementioned clutch assembly may be engaged by a resilient loosening and tensioning element which is reciprocably mounted on the tape deck and, depending upon its diameter and/or length, causes the one and/or the other reel to turn through a predetermined angle such as is necessary to tighten or to loosen the tape. The tape is tightened prior to removal of cartridge from the tape deck so as to move the tape further away from certain deck-mounted components which could damage the tape and would interfere with rapid and convenient removal of a cartridge from the tape deck. On the other hand, it is desirable to at least slightly loosen the tape when the cartridge is properly mounted on the tape deck and before the tape comes into contact with the capstan spindles, tape heads, pinch wheels and pressing members which latter tend to deflect the tape about the faces of tape heads.

According to another feature of my invention, the tape cartridge contains two spring-biased tightening arms which control the formation of convolutions on the tape reels and insure that each convolution is subjected to identical tension as well as that the adjacent convolutions overlap and do not come into contact with the inner surfaces of cartridge shells. This is very important because, by sliding with respect to each other or along the cartridge, the convolutions could produce static electricity which would interfere with proper movements of tape between the tape reels. In addition, the tape would be subjected to excessive wear which would result in unsatisfactory recordal or reproduction of intelligence.

The reels are preferably mounted in antifriction bearings, e.g. ball bearings or plastic bearings which are in direct contact with the cartridge shells. These shells are permanently biased into contact with respective bearings by resilient connecting assemblies of novel design which insure such contact even if the surfaces of shells become worn after extensive use of a cartridge.

A further feature of the invention resides in the provision of deck-mounted pivot bearings which hold the deflecting rollers of a tape cartridge in such a way that the rollers need not contact the shells but actually float between a pair of axially adjustable shaft members in each bearing. In this manner, any inaccuracies in the construction of a cartridge as well as in the construction of deflecting rollers may be compensated for by suitable adjustments in the position of shaft members in each pivot bearing. The inner side of the tape is preferably provided with two layers of electric current conducting material, and at least one deflecting roller is connected to a source of electric current. The one deflecting roller then consists of two current conducting portions which are insulated by a non-conducting layer. Each aforementioned layer on the tape may establish a connection between the two conducting portions which completes an electric circuit and causes a control element in said circuit to reverse the direction in which the tape is advanced or to arrest the drive for the tape reels. Thus, the rollers and the tape may be utilized as component parts of the electric means for reversing the direction in which the tape travels between the supply and takeup reel or for arresting the drive means.

The novel features which are considered as characteristic for the invention are set forth in particular in the appended claims. The invention itself, however, both as to its construction and method of operation, together with additional objects and advantages thereof, will be best understood from the following detailed description of certain specific embodiments when read in connection with the accompanying drawings, in which:

Figure 1:
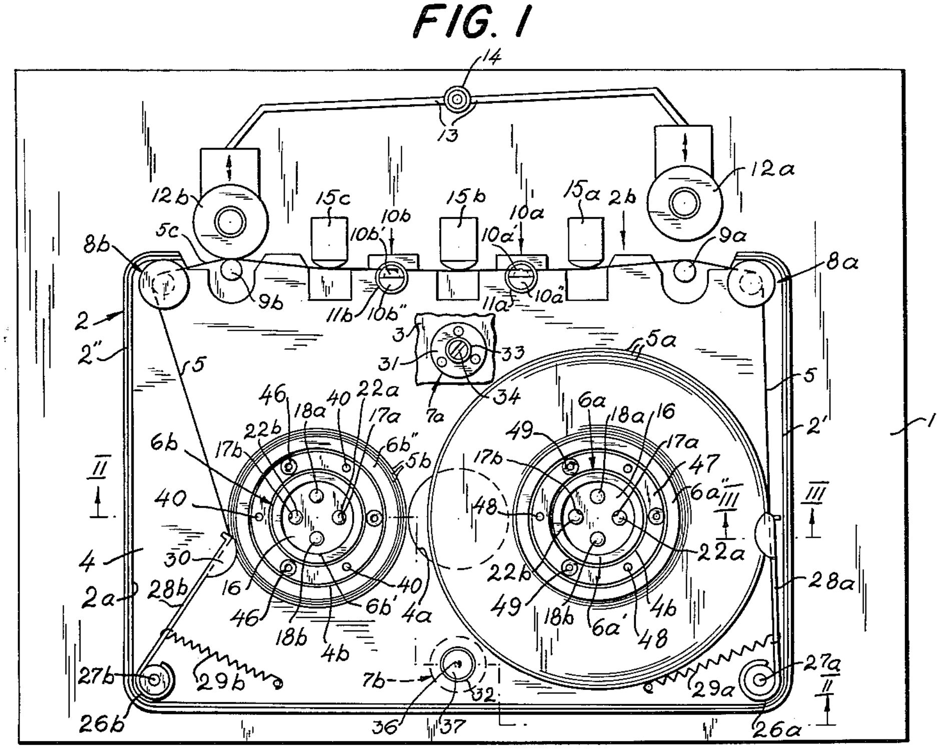
FIG. 1 is a plan view of a tape cartridge which is mounted on the deck of a tape recorder, the upper shell of the cartridge being broken away to reveal the reels and the tape tensioning arms which are mounted in a compartment defined by the shells of the cartridge.

Referring now in greater detail to the drawings, and first to FIG. 1, there is shown a tape deck 1 whose exposed outer side supports a flat, substantially rectangular two-reel magazine or cartridge 2. The cartridge comprises two shells or trays 3, 4 (see FIG. 2) which are formed with overlapping edge portions and are maintained in illustrated position by two resilient connecting assemblies 7*a*, 7*b* which will be described in greater detail hereinafter. The shells 3, 4 define a flat compartment 2*a* which receives a supply reel 6*a* and a takeup reel 6*b* for a finite length of magnetic tape 5. This tape forms a number of convolutions 5*a* on the preferably flangeless supply reel 6*a* and may be wound onto the flangeless takeup reel 6*b* where it forms the convolutions 5*b*. On its way from the reel 6*a* to the reel 6*b*, the tape travels about two spaced deflecting rollers 8*a*, 8*b* which are adjacent to opposite ends of the at least partially open front side 2*b* of the cartridge 2. At the inner side of the tape portion 5*c* which extends between the deflecting rollers 8*a*, 8*b*, the tape deck 1 supports a pair of rotatable capstan spindles 9*a*, 9*b* and two tape guiding members 10*a*, 10*b*, the latter two extending through aligned openings 11*a*, 11*b*, respectively, provided in the shells 3, 4. Each tape guiding member comprises an eccentrically mounted tape guiding portion 10*a*′, 10*b*′ and a substantially cylindrical supporting portion 10*a*″, 10*b*″, respectively. The exact construction and operation of these tape guiding members is described in my copending application Serial No. 21,228, now United States Letters Patent No. 3,043,531 entitled "Deck for Tape Recorders." The tape recorder further comprises two pinch wheels 12*a*, 12*b* mounted at the ends of a two-armed lever 13 which is pivotable about a shaft 14, a record head 15*a*, a central erasing head 15*b*, and a playback head 15*c*. The parts 12*a*—12*b* and 15*a*–15*c* are mounted on the tape deck 1 adjacent to the outer side of the tape portion 5*c*. In the position of FIG. 1, the pinch wheel 12*b* presses the tape portion 5*c* against the capstan spindle 9*b* whereby the latter spills the tape 5 in a direction toward the takeup reel 6*b*. Alternately, the lever 13 may be swung about its shaft 14 in a position in which the pinch wheel 12*a* presses the tape against the capstan spindle 9*a* so that the tape is caused to advance toward the reel 6*a*. The capstan spindles 9*a*, 9*b* are rotatable in opposite directions, and the lever 13 may assume an intermediate position in which the tape portion 5*c* is free to travel from the reel 6*a* to the reel 6*b* or vice versa merely under the action of driving means which rotates the reels.

Figure 2:
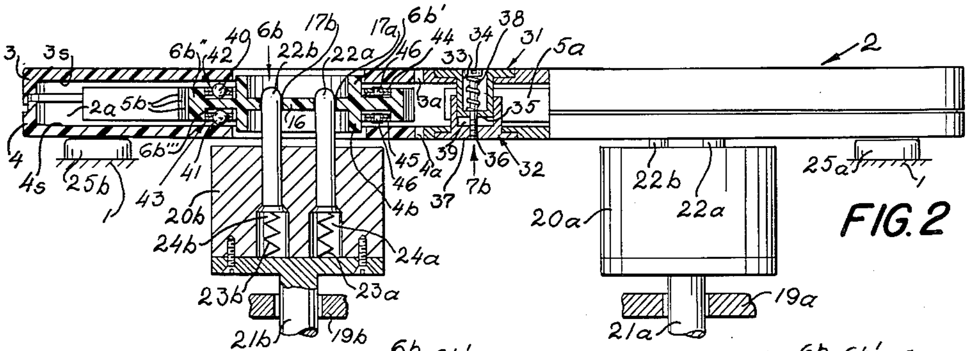
FIG. 2 is a part sectional and part end elevational view of the cartridge as seen in the direction of arrows from the line II—II of FIG. 1, further showing the reel driving and resilient connecting means for the cartridge, as well as one form of bearings for the tape reels.

An important feature of my present invention resides in the provision of improved driving means for the reels 6*a* and 6*b*. In known tape recorders, the supply and takeup reels are driven by coaxial spindles and by one or more eccentric follower members which are mounted on the spindles and engage with suitably configurated portions of the reels. Such arrangement could not eliminate the tilting of reels and resultant irregular advance of the tape, jamming of tape in its cartridge or between the flanges of the reels, and certain other inconveniences. It is desirable to rotate the reels in such a manner that the reels are subjected to pure moments of rotation without any axial or radial forces which would tend to tilt the reels and could cause the just described irregularities in movements of the tape. As is best shown in FIG. 2, each of reels 6*a*, 6*b* is formed with a concentric discoid hub plate 16 defining one or more pairs of symmetrically arranged eccentric apertures. In the illustrated embodiment, the hub plates 16 are formed with two pairs of diametrically opposed eccentric apertures 17*a*, 17*b* and 18*a*, 18*b* with the one pair of apertures turned through 90 degrees with respect to the other pair. The tape deck 1 supports two spaced bearings 19*a*, 19*b* for the shafts 21*a*, 21*b* of two turntables 20*a*, 20*b*, respectively. Each turntable mounts two spring-biased eccentric entraining pins 22*a*, 22*b* which are reciprocable in directions parallel with the turntable axes. These pins are biased by resilient means here shown as helical expansion springs 23*a*, 23*b* which are received in the bores 24*a*, 24*b* of respective turntables. The action of springs 23*a*, 23*b* is such that the pins 22*a*, 22*b* always project beyond the exposed surfaces of turntables 20*a*, 20*b*. When the cartridge 2 is placed onto the tape deck 1, and more particularly onto spaced projections 25*a*, 25*b* which extend from the exposed outer side of the tape deck, the pins 22*a*, 22*b* may extend through circular cutouts 4*b* in the shell 4 and into the apertures 17*a*, 17*b* or 18*a*, 18*b*. An immediate penetration of pins 22*a*, 22*b* into a set of apertures is purely accidental. As a rule, these pins will enter the one or the other pair of apertures only after the turntable 20*a* or 20*b* is set in rotary motion; up to such time, the pins are depressed by the hub plates 16 against the bias of springs 23*a*, 23*b*. The means for rotating the shafts 21*a*, 21*b* of turntables 20*a*, 20*b*, respectively, is not shown in FIGS. 1 and 2.

The pins 22*a*, 22*b* exert only tangential forces upon the hub plates 16 of reels 6*a*, 6*b* without any radial or axial components; therefore, the tilting or axial displacement of these reels is effectively prevented at all times.

Figure 3:
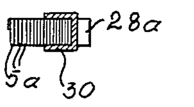
FIG. 3 is a fragmentary section taken along the line III—III of FIG. 1, as seen in the direction of arrows, showing the construction of a tape tensioning arm.

In the two rearmost corners 26*a*, 26*b* of the compartment 2*a*, i.e. in the corners most distant from the tape heads 15a–15c and from the front side 2b, the shells 3, 4 support two pivot axles 27a, 27b, respectively. These pivot axles swingably support the rear ends of two tape guiding and tensioning arms 28a, 28b, respectively, which are biased against the convolutions 5a, 5b by two helical springs 29a, 29b. The forward end portions 30 of the tensioning arms 28a, 28b preferably assume the form of U-shaped channels (see FIG. 3) adapted to receive the outermost convolutions 5a or 5b and to thereby prevent any irregular winding of tape onto the reels 6a and 6b.

The position and contracting force of resilient elements 29a, 29b is selected in such a way that these resilient elements insure practically constant tension in the convolutions of tape 5 when the tape recorder is in actual use, i.e. when the tape travels from the reel 6a to the reel 6b or vice versa. As is known, the tension in the convolutions 5b during winding of tape onto the reel 6b is higher than the tension in convolutions 5a on the reel 6a because the effort arm is much smaller on the reel 6b which carries a smaller number of convolutions, i.e. because the diameter of outermost convolution 5b is small when compared with the diameter of outermost convolution 5a on the supply reel 6a. However, since the left-hand arm 28b is subjected to lesser tension than the right-hand arm 28a, its channel-shaped front end 30 bears against the outermost convolution 5b with a lesser force than the force exerted by the channel-shaped end portion 30 of the arm 28a against the outermost convolution 5a. This will be readily understood since the left-hand resilient element 29b is expanded to a lesser extent than the right-hand resilient element 29a. As the diameter of convolutions 5b increases (it being assumed that the pinch wheel 12b and the capstan spindle 9b advance the tape in a direction toward the takeup reel 6b), the tension in the tape portion which is being convoluted onto the reel 6b decreases because of progressively increasing effort arm, but the pressure of arm 28b against the outermost convolution 5b now increases so that the overall tension in the convolutions 5b remains substantially the same. Analogously, the initially large biasing force of the right-hand resilient element 29a decreases as the number of convolutions 5a on the reel 6a decreases, i.e. proportionally with the decreasing effort arm, so that the convolutions 5a also remain under substantially constant tension. The cutouts 3a, 4a in the shells 3, 4, respectively, permit convenient observation of convolutions 5a, 5b.

In certain presently known tape recorders which utilize a two-reel cartridge for the tape, the tape is wound onto the single- or double-flanged reels, or is merely guided by the inner walls of the compartment defined by the cartridge. Such arrangement produces irregular frictional forces resulting in irregular movements of the tape and attendant inferior recordal or reproduction of intelligence. In addition, the tape is subjected to excessive wear and produces static electricity causing the adjacent convolutions to adhere to each other and preventing uniform movements of tape from the supply reel to the takeup reel, or vice versa. Moreover, any changes in the magnitude of frictional forces developing between the tape on the one hand, and the reel flanges or inner surfaces of the cartridge on the other hand, even more strongly affect uniform advance of the tape.

It will be seen that the tape tensioning arms 28a, 28b and the flangeless reels 6a, 6b fully overcome the above outlined drawbacks of prior constructions. The convolutions 5a, 5b do not come into contact with the reels and are prevented from frictionally engaging with the inner surfaces of shells 3, 4 by being guided in the channel-shaped end portions 30 of members 28a, 28b respectively. Thus, the arrangement of arms 28a, 28b and springs 29a, 29b not only insures uniform tension in the convolutions 5a, 5b but also prevents rapid wear and tear of magnetic tape by preventing the tape from coming into frictional engagement with the reels or with the cartridge. As is clearly shown in FIGS. 2 and 3, the convolutions are in accurately overlapping relationship which prevents the adjacent convolutions from sliding with respect to each other when the tape travels from the reel 6a to the reel 6b, or vice versa.

The width of channels defined by the end portions 30 of tensioning arms 28a, 28b only slightly exceeds the width of magnetic tape 5 and preferably equals the length of tape guiding portions 10a′, 10b′ on the tape guiding members 10a, 10b, respectively.

These channels are deep enough to receive at least two but preferably three or more convolutions (see FIG. 3), and are pivotable substantially radially of the reels 6a, 6b.

It will be readily understood that the contracting springs 29a, 29b may be replaced by expansion springs disposed between the arms 28a, 28b and the lateral cartridge walls 2′, 2″, respectively. The action of arms 28a, 28b upon the convolutions remains unchanged, i.e. the bias of resilient elements again decreases progressively with the advance of channel-shaped end portions 30 substantially radially toward the axes of reels 6a, 6b, and the arms are subjected to progressively increasing resilient bias if their channel-shaped end portions move radially and away from the reels 6a, 6b.

The resilient connecting assembly 7b is shown in greater detail in FIG. 2. It comprises two cup shaped components 31, 32 whose flanges are embedded in the shells 3, 4 respectively. Both components extend into the compartment 2a in such a way that the smaller-diameter component 31 projects through the open end of the larger-diameter component 32. The bore 33 in the component 31 is of such dimensions that it can receive with some play the head of a tightening screw 34 whose stem extends through an orifice in the inner end wall 35 of the component 31 and is screwed into a threaded bore 36 coaxially formed in the outer end wall 37 of the component 32. A helical tensioning spring 38 operates between the head of tightening screw 34 and the inner end wall 35 of the component 31, whereby the upper shell 3 is constantly biased in a direction toward the lower shell 4. The construction of the other connecting assembly 7a is identical. It will be noted that the assemblies 7a, 7b are mounted symmetrically with respect to and at the opposing sides of a plane common to the axes of the reels 6a, 6b. The overlapping edge portions of shells 3, 4 are of such height that the inner end wall 35 of the component 31 and the outer end wall 37 of the component 32 define a small cylindrical chamber 39 thus insuring that the spring 38 may expand and may press the inner surfaces 3s, 4s of shells 3, 4, respectively, against the balls 40, 41 in the antifriction bearings 42, 43, respectively, mounted on the reel 6b. These antifriction bearings have a common inner race 6b′ and a common outer race 6b″, both races constituting integral cylindrical parts of the reel 6b and being connected by an annular web 6b‴. The parts 6b′, 6b″ and 6b‴ define two annular recesses for the cages 44, 45 of the balls 40, 41 respectively. Each of cages 44, 45 mounts three equally spaced balls 40, 41, respectively. Reference numerals 46 denote rivets which connect the halves of cages 44, 45, respectively, to each other.

The tensioning spring 38 constantly biases the inner surfaces 3s, 4s of shells 3, 4 against the balls 40, 41, respectively, and the provision of aforementioned chamber 39 insures that the balls remain in rolling contact with the inner surfaces of shells 3, 4 even if these surfaces are subjected to considerable wear. In this manner, the reels 6a, 6b are properly centered in the cartridge 2. The construction of bearings on the reel 6a is the same as the construction of bearings on the reel 6b. FIG. 1 shows only the inner race 6a′, the outer race 6a″ and a cage 47 for the balls 48, the halves of this cage being held together by rivets 49.

Figure 4:
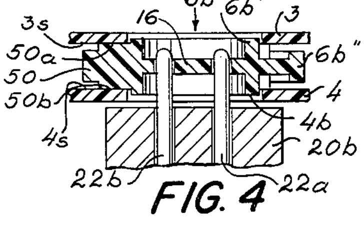
FIG. 4 is an axial section through a modified bearing for a tape reel.

FIG. 4 illustrates a pure plastic bearing wherein the aforementioned balls are replaced by three uniformly spaced cams 50 (only one shown) which are integral with the reel *6b* and extend between the cylindrical parts *6b'*, *6b''* into sliding engagement with inner surfaces *3s*, *4s* of the shells 3, 4, respectively. The annular contact surfaces 50*a*, 50*b* of each cam 50 may be coated with a suitable friction reducing substance, e.g. molybdenum sulfide powder or the like.

Figure 5:
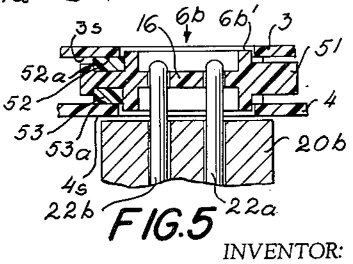
FIG. 5 is a similar axial section through a further bearing.

Referring now to FIG. 5, there is shown a modified plastic bearing which comprises three pairs of plastic bearing members 52, 53 (only one pair shown) which are inserted into suitable recesses provided in the opposing sides of a ring 51 coaxially surrounding the cylindrical part *6b'* of the reel *6b*. The contact surfaces 52*a*, 53*a* of bearing members 52, 53 slide along the inner surfaces *3s*, *4s* of the shells 3, 4, respectively, when the reel *6b* rotates. Regardless of their specific construction, the bearings of FIGS. 1, 2, 4 and 5 insure friction-free rotation of reels *6a*, *6b* in the cartridge 2 even after extensive use of the cartridge. Combined with the novel driving arrangement for the reels *6a*, *6b*, the bearings insure superior performance of a so constructed tape recorder.

The small gap 54 (see FIG. 2) between the overlapping edges of shells 3, 4 is provided in a new cartridge to allow for wear of inner surfaces *3s*, *4s* under the action of balls 40, 41, 48 (FIGS. 1 and 2), of plastic cams 50 (FIG. 4), or of bearing members 52, 53 (FIG. 5). This gap is progressively narrowed as the wear upon the surfaces *3s*, *4s* increases.

Figures 6, 7:
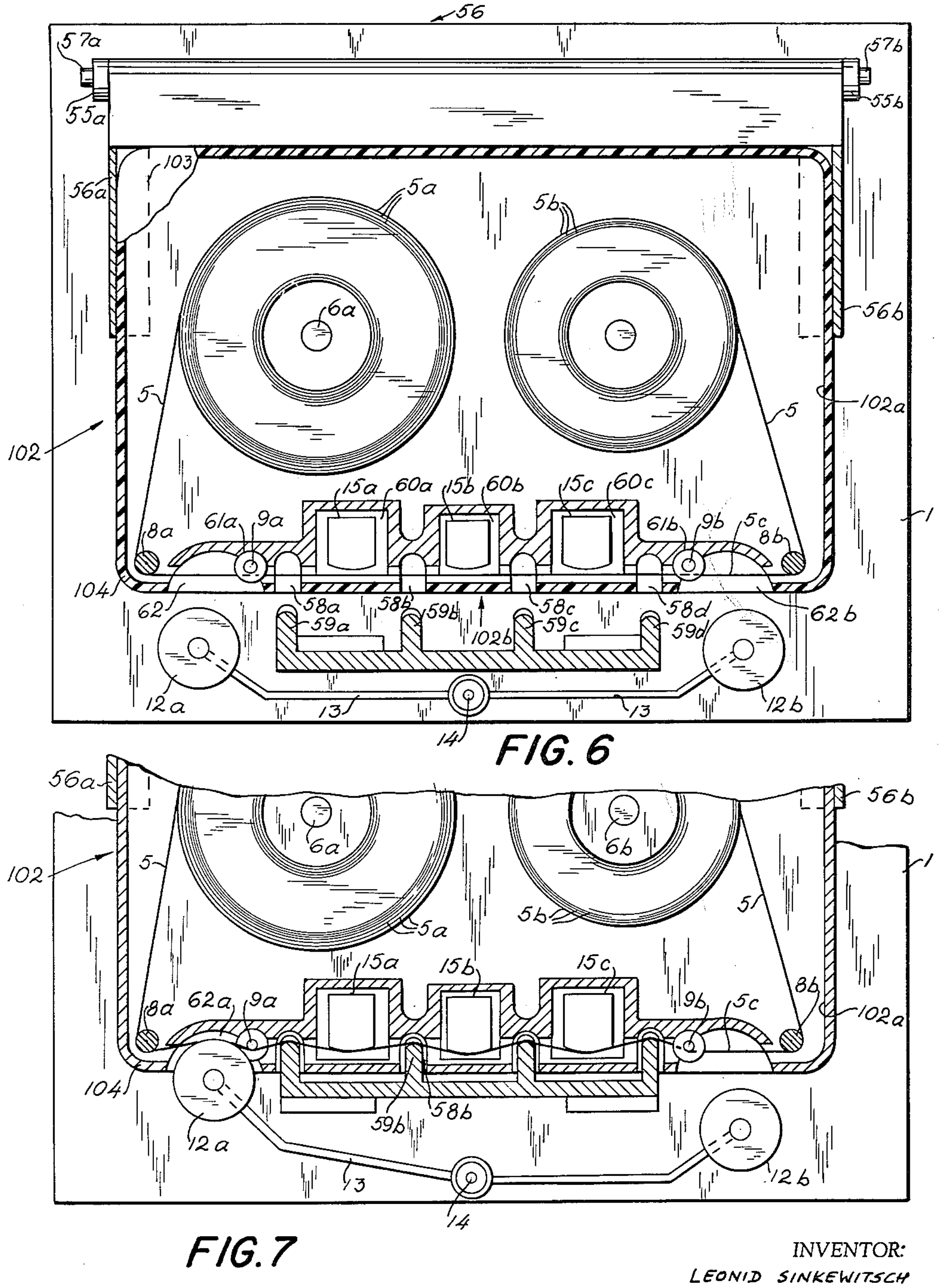
FIG. 6 is a plan view of a modified cartridge mounted on the deck of a slightly different tape recorder, the upper shell of the cartridge being broken away to reveal the position of certain tape contacting elements when the recorder is not in use.
FIG. 7 is a fragmentary view of the tape recorder shown in FIG. 6 with certain tape contacting elements in the position they assume when the recorder is in actual use.

Referring now to FIGS. 6 and 7, there is shown a slightly modified tape recorder whose tape deck 1 carries two aligned bearings 55*a*, 55*b* for the journals 57*a*, 57*b* of a swingable frame 56. The frame is formed with two channel shaped arms 56*a*, 56*b* adapted to receive a modified tape cartridge 102 which is swingable with the frame about the common axis of parts 55*a*, 55*b* and 57*a*, 57*b* between the position of FIGS. 6 and 7 and an inclined position in which it may be withdrawn from the arms 56*a*, 56*b*. The compartment 102*a* between the shells 103, 104 receives two flangeless reels *6a*, *6b* whose construction and mounting is identical with that of the reels shown in FIGS. 1 and 2. The resilient connecting assemblies for the shells 103, 104 have been omitted for the sake of clarity.

The front side of the cartridge is formed with four parallel recesses 58*a*, 58*b*, 58*c*, 58*d* for the tape guiding members 59*a*, 59*b*, 59*c*, 59*d*, respectively, these guiding members replacing the members 10*a*, 10*b* and being mounted in suitable pivot bearings at the outer side of tape portion *5c*. The tape heads 15*a*, 15*b*, 15*c* extend through the cutouts 60*a*, 60*b*, 60*c*, respectively, formed in the shells of cartridge 102 at the inner side of the tape portion *5c*. Additional recesses 61*a*, 61*b* and 62*a*, 62*b* are provided in the front side 102*b* for the capstan spindles *9a*, *9b* and pinch wheels 12*a*, 12*b*, respectively.

In the position of FIG. 6, the tape 5 is assumed to be rapidly paid out by the reel *6a* and taken up by the reel *6b*, or vice versa; therefore, the spindles *9a*, *9b*, the tape heads 15*a*–15*c*, the pinch wheels 12*a*, 12*b* and the guiding members 59*a*–59*d* are spaced from the tape portion *5c* which travels in a straight path from the deflecting roller *8a* to the deflecting roller *8b* or vice versa. In FIG. 7, the pinch wheel 12*a* presses the tape portion *5c* against the capstan spindle *9a* so that the tape spills toward and is taken up in the form of convolutions *5a* on the reel *6a*. The tape heads 15*a*–15*c* and the tape guiding members 59*a*–59*d* are pivoted toward the tape portion *5c* so that the tape is deflected through predetermined angles about the tape heads. The exact construction of bearings for the tape heads 15*a*–15*c* and tape guiding members 59*a*–59*d* is described in my copending application Serial No. 26,771 entitled "Bearing for Tape Contacting Elements on the Decks of Tape Recorders." By being pivotable between the positions of FIGS. 6 and 7, the tape contacting elements 15*a*–15*c* and 59*a*–59*d* permit unimpeded movements of cartridge 102 about the axis of journals 57*a*, 57*b* and, on the other hand, properly guide the tape during recordal or playback of intelligence. The tape guiding members 59*a*–59*d* are provided with means for holding the tape against lateral movements which is particularly important when the tape is of the four-track type.

When the tape guiding members are moved from the position of FIG. 7 into the position of FIG. 6, the length of tape portion *5c* is greater than the shortest distance between the deflecting rollers *8a*, *8b* because this tape portion was deflected about the faces of tape heads 15*a*–15*c* (see FIG. 7). Therefore, the loosely hanging tape portion *5c* could interfere with movements of the carriage 102. For example, the tape may be caught on the tape heads or on the capstan spindles. Thus, it is desirable either to insert or to remove the cartridge from the frame 56 while the tape portion *5c* extends in a straight line between the deflecting rollers *8a*, *8b* so that the tape cannot be damaged by deck-mounted components of the tape recorder.

On the other hand, it is equally desirable to at least slightly loosen the tape portion *5c* before the tape heads 15*a*–15*c* and the tape guiding members 59*a*–59*d* are moved thereagainst because they may unduly stretch the tape portion *5c*. In other words, it is desirable to tighten the tape portion *5c* before the cartridge is pivoted away from the tape deck and to loosen the tape portion prior to pivotal movements of elements 15*a*–15*c* and 59*a*–59*d* thereagainst.

Figure 8:
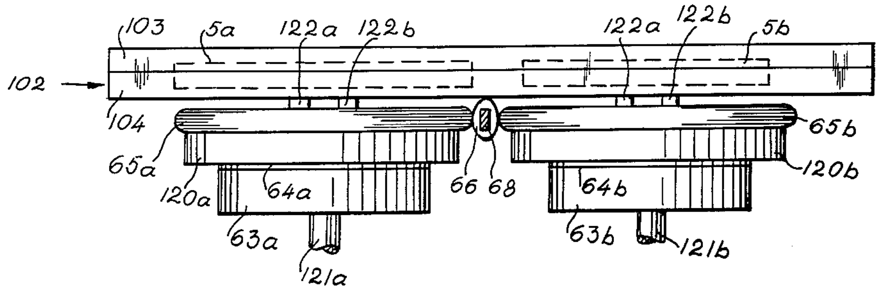
FIG. 8 is a greatly enlarged schematic side elevational view of a slightly modified driving arrangement for the tape reels, further showing a tape tensioning and loosening element which cooperates with certain components of the driving arrangement.
Figure 9:
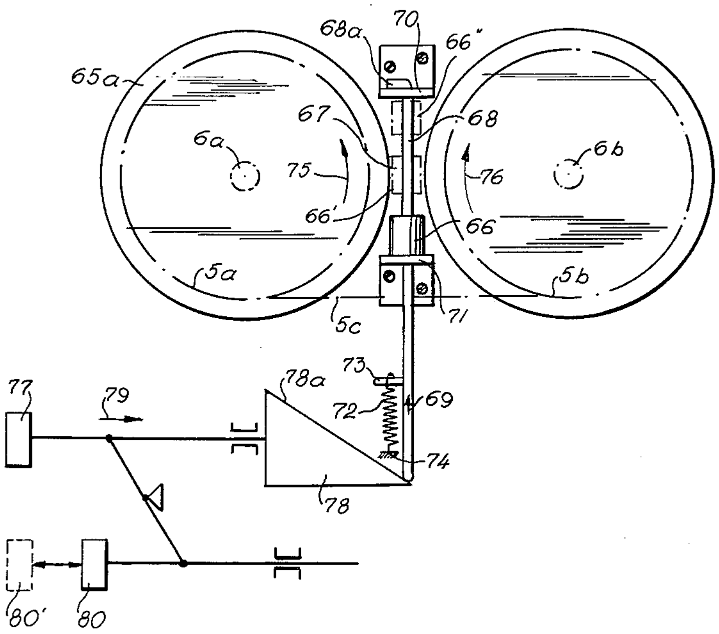
FIG. 9 is a schematic plan view of the means which reciprocates the tape tightening and loosening element.

The means for selectively loosening and tightening the tape mounted in a cartridge 102 is shown in FIGS. 8 and 9. The driving arrangement for the reels *6a*, *6b* (shown in phantom lines in FIG. 9) comprises two slightly modified turntables 120*a*, 120*b* each mounting a pair of vertically reciprocable entraining pins 122*a*, 122*b* which enter the apertures in the reels *6a*, *6b* as described in connection with FIGS. 1 and 2. Each turntable constitutes one component of a friction clutch and preferably consists of a suitable synthetic plastic material. The other component of each friction clutch consists of a smaller-diameter discoid member 63*a*, 63*b*, respectively, separated from components 120*a*, 120*b* by layers 64*a*, 64*b* of felt or the like. The suitably rounded upper end portions 65*a*, 65*b* of components 120*a*, 120*b* are of somewhat greater diameter and define therebetween a narrow gap 67 for the passage of a resilient tape loosening and tightening element 66. The lower clutch components 63*a*, 63*b* may be driven by the shafts 121*a*, 121*b*, respectively.

The element 66 is mounted on a non-circular rod 68 which is reciprocable in a plane intersecting at right angles the plane common to the axes of clutch components 120*a*, 120*b* and 63*a*, 63*b*, i.e. the element 66 is reciprocable substantially tangentially with respect to the components or turntables 120*a*, 120*b*. The rod 68 is operable in and counter to the direction indicated by an arrow 69, and is mounted in two spaced bearing brackets 70, 71 secured to the tape deck (not shown in FIGS. 8 and 9). This rod is constantly biased into the position of FIG. 9 by a resilient element 72 so that the bent end portion 68*a* abuts against the upstanding portion of the bracket 70. The resilient element 72 preferably assumes the shape of a helical spring one end of which is anchored in a radial lug 73 forming part of the rod 68 and the other end of which is secured to a stationary part of the tape deck, as at 74.

The diameter and length of the element 66 determine the extent of angular displacement of clutch components 120*a*, 120*b* and hence of tape reels *6a*, *6b*, respectively. When the rod 68 is axially shifted in the direction indicated by the arrow 69, the element 66 moves into a phantom-line intermediate position 66', and finally into its second extreme position 66''. While moving into the position 66'', the element 66 frictionally engages with the portions 65*a*, 65*b* of clutch components 120*a*, 120*b*, respectively, and rotates these components in directions indicated respectively by the arrows 75 and 76. The width of the gap 67 is somewhat less than the maximum transverse dimension of elastic element 66 so that this element is slightly compressed when it assumes the phantom-line intermediate position 66'. As the reels 6a, 6b rotate in the direction of arrows 75, 76, respectively, the tape portion 5c becomes loose because the outermost convolutions 5a, 5b are partially paid out by the reels. On the other hand, when the resilient element 72 causes the rod 68 and the element 66 to return into the position of FIG. 9, the reels 6a 6b rotate in directions to tighten the tape portion 5c. As mentioned hereinabove, the extent to which the tape portion 5c may be tightened or loosened depends upon the length of the element 66 and to a certain extent also on the transverse dimensions of this element. Of course, it will be readily understood that the tape heads 15a–15c and tape guiding members 59a–49d are in the position of FIG. 6, i.e. spaced from the tape portion 5c, when the element 66 is moved in either direction. When the element 66 is moved from the phantom-line position 66" into its full-line position of FIG. 9 (under the bias of resilient element 72), the tape portion 5c is sufficiently taut to permit convenient removal of cartridge 102 from the tape deck 1.

The means for reciprocating the rod 68, i.e. for moving this rod against the bias of the resilient element 72, is shown somewhat schematically in FIG. 9. It is preferred to operate this reciprocating means in a fully automatic way, for example, by the "start" control element, i.e. a pushbutton 77 which is connected with a wedge-shaped cam 78, the latter having an inclined cam surface 78a in contact with the free end of the rod 68. When the control element or button 77 is depressed in the direction indicated by the arrow 79, the cam surface 78a causes the rod 68 to move against the bias of the resilient element 72 and to move the element 66 through the gap 67 (position 66') and into the second extreme position 66". The element 66 thereby loosens the tape portion 5c by rotating the clutch components 120a, 120b in the direction of arrows 75, 76, respectively, so that the tape heads 15a–15c and tape guiding members 59a–59d may be moved against but do not unduly expand the tape portion 5c.

The "start" pushbutton 77 is articulately connected with a second control element in the form of a "stop" button 80 which automatically moves into the inoperative position 80' when the member 77 is shifted in the direction of arrow 79. When the button 80 is depressed and moves into its full-line position, it automatically returns the button 77 into the position of FIG. 9 so that the cam surface 78a permits the resilient element 72 to return the element 66 into the full-line position whereby the tape portion 5c is tightened and permits unimpeded movements of cartridge 102 with respect to the tape deck. By depressing the button 80, an operator may bring about simultaneous movement of tape heads 15a–15c and tape guiding members 59a–59d into the position of FIG. 6. The articulate connection between the buttons 77 and 80, e.g. a suitable link train or the like, is of well known design and need not be described in greater detail. If it is desired to change the extent to which the tape portion 5c is tightened or loosened, the element 66 is simply replaced by a differently dimensioned element so that it may bring about a greater or smaller angular displacement of clutch components 120a, 120b.

Of course, it will be readily understood that the resilient element 66 may be mounted in such a way as to bring about only angular displacements of the clutch component 120a or 120b, i.e. this element need not necessarily rotate both tape reels and need not necessarily be mounted for tangential movement through the gap 67 between the portions 65a, 65b of the upper clutch components. However, the arrangement of FIG. 9 is preferred because it simultaneously loosens or tightens both ends of the tape portion 5c. The feature that the element 66 may be shifted by the "start" and "stop" buttons 77, 80 is of particular advantage because it prevents an unskilled person from tightening or loosening the tape at a time when the change in tension could affect the operation of a tape recorder.

Figure 11:
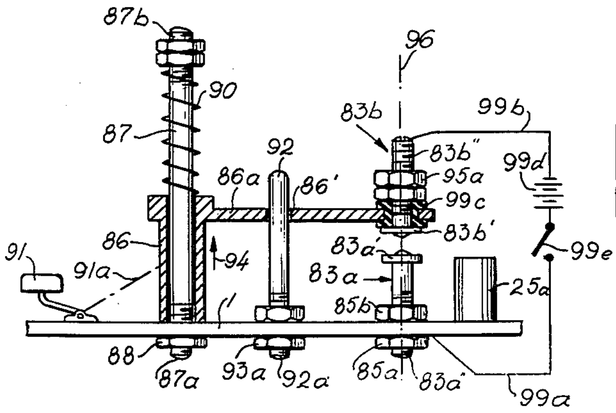
FIG. 11 is a partly elevational and partly sectional view of a pivot bearing for the deflecting roller.
Figure 10:
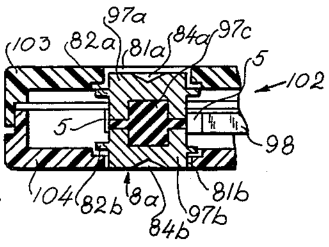
FIG. 10 is an enlarged axial section through a tape deflecting roller.
Figure 12:
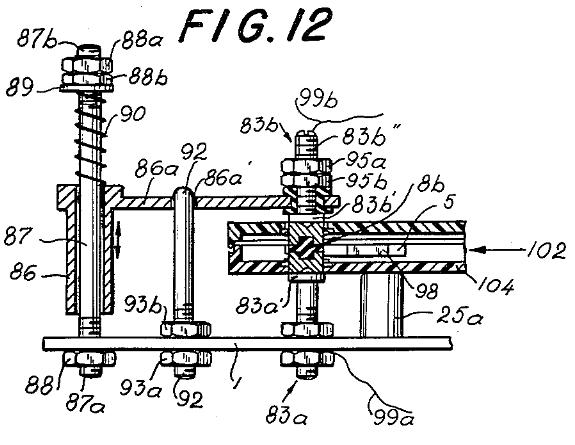
FIG. 12 is a view partly in section which shows the pivot bearing in operative position in which it holds a deflecting roller in requisite position to insure unimpeded advance of the tape.

The pivot bearing assembly shown in FIGS. 10 to 12 faciliates more uniform advance of the tape between the reels 6a, 6b. The tape recorder comprises two such pivot bearing assemblies and each of aforementioned deflecting rollers 8a, 8b forms part of a pivot bearing assembly. Since the construction of the rollers 8a, 8b is identical, only the roller 8a has been shown on a greatly enlarged scale in FIG. 10. The shells 103, 104 are formed with aligned openings 81a, 81b, respectively, whose dimensions are such that the deflecting roller 8a is free to perform limited axial and radial movements in the shells and, in addition, is freely rotatable about its axis. When the cartridge 102 is not mounted on the tape deck 1, one of the roller flanges 82a, 82b rests in a suitable annular depression formed in the shell 103, 104, respectively, depending upon whether the cartridge is in the position of FIG. 10 or is turned upside down. It will be seen that, though the roller 8a is held by the cartridge shells 103, 104, these shells cannot determine its exact position when the tape recorder is in actual use, i.e. when the tape 5 travels between the reels 6a, 6b. In other words the shells 103, 104 cannot control the position of tape because they receive the roller 8a with such play that the tape is readily shiftable with respect to the cartridge.

The other component of the pivot bearing assembly comprises a fixed shaft member 83a and an axially and angularly shiftable shaft member 83b, these shaft members being formed with conical end portions 83a', 83b', respectively. The exposed end faces of the roller 8a are formed with mating conical holes 84a, 84b for the end portions 83b', 83a' of shaft members 83b, 83a, respectively. When the cartridge is properly mounted on the tape deck 1, its shell 104 rests upon the projections 25a, 25b (the latter shown in FIG. 2) and the end portion 83a' of the fixed shaft member 83a extends into the conical hole 84b. The shaft member 83a is externally threaded, as at 83a", and is axially adjustably secured to the tape deck 1 by two nuts 85a, 85b. The threaded portion 83a" extends through a suitable boring in the tape deck so that the screws 85a, 85b may bear against the underside and upper side, respectively, of the tape deck in order to fix the shaft member 83a in required axial position.

The other shaft member 83b is adjustably secured to the radial arm 86a of a tubular supporting member or sleeve 86 which is axially shiftable on a bolt 87. The lower end portion 87a of this bolt is threaded into the tape deck 1 and is additionally secured thereto by a nut 88. The upper end portion 87b of the bolt 87 carries two lock nuts 88a, 88b, the latter of which acts as an abutment for a washer 89. The sleeve 86 is permanently biased in a direction toward the tape deck 1 by a helical expansion spring 90 which operates between the washer 89 and the upper end face of the member 86, and surrounds the bolt 87. As is shown in FIG. 11, the sleeve 86 may be shifted against the bias of spring 90 by a control element formed as a pushbutton 91 which is pivoted to the tape deck and is connected to the sleeve 86 by a schematically indicated system of levers 91a or the like. The arm 86a is formed with an aperture 86a' for a locator pin 92 whose lower end 92a is screwed into the tape deck and is secured thereto by two nuts 93a, 93b. In order to move the end portion 83b' of the upper shaft member 83b into the conical hole 84a of the roller 8a, the operator depresses the pushbutton 91 and thereby lifts the sleeve 86 in the direction indicated by the arrow 94. The shaft member 83b is then moved away from the shaft member 83a so that the cartridge 102 may be readily placed onto the projections 25a, 25b particularly since, once the arm 86a is lifted above the locator pin 92, the sleeve 86 may be swung about the bolt 87 so as to move the shaft member 83b out of coaxial alignment with the shaft member 83a. When the end portion 83a' is properly received in the hole 84b, the operator releases the pushbutton 91 and simultaneously pivots the arm 86a about the bolt 87 so as to return the shaft member 83b into alignment with the shaft member 83a. The spring 90 then expands and automatically moves the end portion 83b' into the conical hole 84a. The pin 92 then enters the aperture 86a' and holds the arm 86a against angular displacements. As is shown in FIG. 12, the mounting of the fixed shaft member 83a is such that the end portions 83a', 83b' center the roller 8a in the cartridge so that this roller actually floats between and need not contact the shells 103, 104. It will be readily understood that such mounting reduces friction since the roller 8a contacts only the tips of end portions 83a', 83b' but need not be in contact with the cartridge.

The shaft member 83b is externally threaded as at 83b'', and is axially adjustably fixed to the arm 86a by two lock nuts 95a, 95b. The common axis of shaft members 83a, 83b in roller-retaining position is indicated by the reference numeral 96.

As has been explained hereinabove, the tape contacting elements 15a–15c and 59a–59d or 10a, 10b, as well as the capstan spindles 9a, 9b and pinch wheels 12a, 12b are mounted on the tape deck 1. The rollers 8a, 8b, on the other hand, are mounted in the cartridge 2 or 102 which is removably secured to the tape deck. If the rollers 8a, 8b are not finished with utmost precision, the discrepancy between the necessary and actual position of these rollers with respect to deck-mounted tape contacting elements could adversely affect the movements of tape 5. The above described pivot bearing assemblies compensate for such inaccuracies because the shaft members 83a, 83b, too, are mounted on the tape deck and the rollers 8a, 8b are received in shells 103, 104 with such radial and axial play that any inaccuracies are fully compensated for when the rollers are received between the respective shaft members. The adjustments in axial directions of rollers 8a, 8b are considered sufficient to compensate for eventual inaccuracies in mounting of the rollers within the cartridge. In other words, the deck-mounted shaft members of both pivot bearings insure proper positioning of rollers 8a, 8b with respect to other deck-mounted components regardless of inaccurate mounting of the cartridge on the tape deck and regardless of inaccuracies in the mounting of rollers 8a, 8b in the cartridge. By axially adjusting the shaft members 83a, 83b with respect to the tape deck 1 and arm 86a, respectively, an operator may adjust the position of magnetic tape in the cartridge. It will be seen that, by the provision of just described pivot bearing assemblies a cartridge tape can be guided with the same accuracy as the reel-to-reel tape, i.e. as a tape which is mounted on two reels not received in a cartridge.

At least one of rollers 8a, 8b is preferably constructed in the manner as shown in FIG. 10. Thus, the roller 8a comprises two similar portions 97a, 97b which consist of electric current conducting material and are separated by a layer of insulating material 97c. Such arrangement is of advantage because the roller may be utilized for electrically reversing the direction in which the tape advances. The inner side of tape 5 is provided with a short layer of conductor foil 98 which contacts the portions 97a, 97b of the roller 86 when the tape is nearly completely unwound from the reel 6a or 6b. The shaft members 83a, 83b are connected with the terminals of conductor wires 99a, 99b, respectively, and the shaft member 83b is insulated from the arm 86a by a sleeve 99c. The other end of tape 5 carries a similar layer or foil 98 which again establishes an electric connection between the roller portions 97a, 97b when the tape completes its advance in the other direction. Owing to such construction, the drive means cannot rotate the reels once the tape is nearly completely paid out by the one or the other reel because the control element, e.g. a reversing switch or the like in the circuit of roller portions 97a, 97b automatically reverses or arrests the drive means whenever the one or the other foil 98 completes the electric circuit by coming into contact with the roller portions 97a, 97b. The electric circuit comprises a source of electrical energy 99d and a switch 99e, e.g. a reversing switch which controls the reversible motor means for the friction clutches of turntables 20a, 20b or 120a, 120b. The exact construction of such motors and of the switch means 99e forms no part of the present invention.

It will be understood that each of the elements described above, or two or more together, may also find useful application in other types of tape recorders differing from the types above, for example, in certain recorders operating with reel-to-reel tape.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. In a tape recorder, in combination, a tape deck; a first and a second tape reel each comprising a concentric hub plate and a plurality of symmetrically arranged eccentric apertures in said hub plate; and first and second drive means for said first and second reel, respectively, each drive means comprising a deck-mounted rotary turntable having an axis of rotation and an exposed surface, a plurality of eccentric entraining pins each mounted in and reciprocable in directions parallel with the axis of said turntable, and resilient means for biasing said pins in a direction to project beyond said exposed surface, said pins receivable in the apertures of the respective reel in such manner that the reel is centered on the turntable and is subjected to pure tangential forces causing it to rotate with the turntable.

2. In a tape recorder, in combination, a tape deck; a first and a second reel for a finite length of magnetic tape, the tape forming convolutions on said reels and being paid out by one reel to be taken up by the other reel when the reels rotate in one direction, and vice versa, each of said reels comprising a central portion having at least one pair of eccentric apertures disposed at diametrically opposite sides of the axis of the respective reel; first and second deck-mounted drive means for said first and second reel, respectively, each drive means comprising a rotary turntable, a pair of eccentric entraining means mounted in, adapted to project from and reciprocable in the axial direction of the respective turntable, and spring means for biasing said entraining means into the apertures of the respective reel; and means for uniformly tensioning the convolutions of tape on said reels, said tensioning means comprising a tensioning member for each reel, each tensioning member having a portion engaging with the outermost convolution on and pivotable substantially radially of the respective reel, and resilient means constantly biasing said portions of the tensioning members toward the respective reels in such manner that the bias of said resilient means decreases as said portions of the tensioning members move toward the respective reels whereby the tension in the convolutions of tape remains unchanged when the tape travels between said reels.

3. In a tape recorder, in combination, a tape deck; a first and a second reel for a finite length of magnetic tape, the tape forming convolutions on said reels and being paid out by one reel to be taken up by the other reel when the reels rotate in one direction, and vice versa, each of said reels comprising a central portion having at least one pair of eccentric apertures disposed at diametrically opposite sides of the axis of the respective reel; first and second deck-mounted drive means for said first and second reel, respectively, each drive means comprising a rotary turntable, a pair of eccentric entraining means mounted in, adapted to project from and reciprocable in the axial direction of the respective turntable, and spring means for biasing said entraining means into the apertures of the respective reel; and means for uniformly tensioning the convolutions of tape on said reels, said tensioning means comprising a tensioning member for each reel, each tensioning member having a U-shaped portion engaging with the outermost convolution on and pivotable substantially radially of the respective reel, each said U-shaped portion embracing at least two convolutions of tape on the respective reel and insuring full overlap of said convolutions, and resilient means constantly biasing said U-shaped portions of the tensioning members toward the respective reels in such manner that the bias of said resilient means decreases as said U-shaped portions of the tensioning members move toward the respective reels whereby the tension in the convolutions of tape remains unchanged when the tape travels between said reels.

4. In a tape recorder, in combination, a tape deck; a tape cartridge removably mounted on said tape deck, said cartridge having a front side and defining a flat compartment; a first and a second tape reel rotatably mounted in said compartment for supporting a finite length of magnetic tape, each of said reels comprising a central portion having at least one pair of diametrically opposed eccentric apertures and said cartridge having opening means loosely receiving said central portions, the tape extending along the front side of said cartridge, forming convolutions on said reels and being payed out by one reel to be taken up by the other reel when the reels rotate in one direction, and vice versa; first and second deck-mounted drive means for said first and second reel, respectively, each drive means comprising a rotary turntable, a pair of eccentric entraining means mounted in, adapted to project from and reciprocable in the axial direction of the respective turntable, and spring means for biasing said entraining means into the apertures of the respective reel; and means for uniformly tensioning the convolutions of tape on said reels, said tensioning means comprising a tensioning member for each reel, each tensioning member having a first and pivotally mounted in said compartment at a point distant from said front side and a second end engaging with the outermost convolution and pivotable about the first end substantially radially of the respective reel, and resilient means operating between said cartridge and said tensioning members for constantly biasing said second ends toward the respective reels in such manner that the bias of said resilient means decreases as said second ends move toward the respective reels whereby the tension in the convolutions of tape remains unchanged when the tape travels between said reels.

5. In a tape recorder, in combination, a tape deck; a tape cartridge removably mounted on said deck, said cartridge comprising a first and a second shell each having an inner surface and said shells defining a compartment between said inner surfaces; a first and a second reel rotatably mounted in said compartment for supporting a finite length of magnetic tape, the tape forming convolutions on said reels and being paid out by one reel to be taken up by the other reel when the reels rotate in one direction, and vice versa; first and second bearing means disposed between each reel and said first and second shell, respectively, said bearing means having contact surfaces engaging with the inner surface of the respective shell; resilient connecting means between said shells for constantly biasing said inner surfaces into engagement with the contact surfaces of the respective bearing means; and first and second deck-mounted drive means for said first and second reel, respectively, each drive means comprising entraining means adapted to engage with the respective reel in such manner that the reel is subjected to pure tangential forces when rotated by the drive means.

6. In a tape recorder, in combination, a tape deck; a tape cartridge removably mounted on said deck, said cartridge comprising a first and a second shell each having an inner surface and said shells defining a compartment between said inner surfaces; a first and a second reel rotatably mounted in said compartment for supporting a finite length of magnetic tape, the tape forming convolutions on said reels and being payed out by one reel to be taken up by the other reel when the reels rotate in one direction, and vice versa; plastic bearing means integrally formed with each reel and disposed between said first and second shell, respectively, said bearing means having contact surfaces engaging with the inner surfaces of said shells; resilient connecting means between said shells for constantly biasing said inner surfaces into engagement with the contact surfaces of said bearing means; and first and second deck-mounted drive means for said first and second reel, respectively, each drive means comprising entraining means adapted to engage with the respective reel in such manner that the reel is subjected to pure tangential forces when rotated by the drive means.

7. In a tape recorder, in combination, a tape deck; a tape cartridge removably mounted on said deck, said cartridge comprising a first and a second shell defining a compartment therebetween; a first and a second reel rotatably mounted in said compartment for supporting a finite length of magnetic tape, the tape forming convolutions on said reels and being payed out by one reel to be taken up by the other reel when the reels rotate in one direction, and vice versa; bearing means disposed between each reel and said first and second shell, respectively; resilient connecting means for constantly biasing said shells into engagement with said bearing means; and first and second deck-mounted drive means for said first and second reel, respectively.

8. In a tape recorder, in combination, a tape deck; a tape cartridge removably mounted on said deck, said cartridge comprising a first and a second shell defining a compartment therebetween; a first and a second reel rotatably mounted in said compartment for supporting a finite length of magnetic tape, the tape forming convolutions on said reels and being payed out by one reel to be taken up by the other reel when the reels rotate in one direction, and vice versa; bearing means disposed between each reel and said first and second shell, respectively; resilient connecting means for constantly biasing said shells into engagement with said bearing means, said connecting means comprising a first and a second cup-shaped component connected with said first and second shell respectively, said components extending into said compartment and one of said components axially movably received in the other component, axially adjustable tightening means connected with said other component and extending into said one component, and resilient means operating between said tightening means and said one component and constantly biasing said one component into the other component; and first and second deck-mounted drive means for said first and second reel, respectively, each drive means comprising entraining means adapted to engage with the respective reel in such manner that the reel is subjected to pure tangential forces when rotated by the drive means.

9. In a tape recorder, in combination, a tape deck; a tape cartridge removably mounted on said deck, said cartridge comprising a first and a second shell each having an inner surface and said shells defining a compartment between said inner surfaces; a first and a second reel rotatably mounted in said compartment for supporting a finite length of magnetic tape, the tape forming convolutions on said reels and being payed out by one reel to be taken up by the other reel when the reels rotate in one direction, and vice versa; first and second ball bearing means disposed between each reel and said first and second shell, respectively, said bearing means comprising balls engaging with the inner surfaces of respective shells; resilient connecting means for constantly biasing said inner surfaces into engagement with said balls; and first and second deck-mounted drive means for said first and second reel, respectively, each drive means comprising entraining means adapted to engage with the respective reel in such manner that the reel is subjected to pure tangential forces when rotated by the drive means.

10. In a tape recorder, in combination, a tape deck; a first and a second reel for a finite length of tape, a portion of the tape extending between said reels and the tape forming convolutions on said reels and being payed out by one reel to be taken up by the other reel when the reels rotate in one direction, and vice versa; first and second drive means for said first and second reel, respectively, each drive means comprising a rotary turntable and entraining means mounted on the turntable and adapted to engage with the respective reel; and means for selectively tensioning and loosening said tape portion, said last mentioned means comprising a resilient element and means for reciprocating said element substantially tangentially into engagement with at least one of said turntables whereby said one turntable is rotated in one direction to loosen said tape portion when the resilient element is reciprocated in a first direction, and said one turntable is rotated in the other direction to loosen said tape portion when the resilient element is reciprocated in a second direction.

11. In a tape recorder, in combination, a tape deck; a first and a second reel for a finite length of tape, a portion of the tape extending between said reels and the tape forming convolutions on said reels and being payed out by one reel to be taken up by the other reel when the reels rotate in one direction, and vice versa; first and second drive means for said first and second reel, respectively, each drive means comprising a rotary turntable and entraining means mounted on the turntable and adapted to engage with the respective reel in such manner that the reel is centered on the turntable and is subjected to pure tangential forces when the turntable rotates; and means for selectively tensioning and loosening said tape portion, said last mentioned means comprising a resilient element, means for reciprocating said element substantially tangentially into engagement with at least one of said turntables whereby said one turntable is rotated in one direction to loosen said tape portion when the resilient element is reciprocated in a first direction, and said one turntable is rotated in the other direction to loosen said tape portion when the resilient element is reciprocated in a second direction, and control means for operating said reciprocating means.

12. In a tape recorder, in combination, a tape deck; a first and a second reel for a finite length of tape, a portion of the tape extending between said reels and the tape forming convolutions on said reels and being payed out by one reel to be taken up by the other reel when the reels rotate in one direction, and vice versa; first and second drive means for said first and second reel, respectively, each drive means comprising a rotary turntable and entraining means mounted in the turntable and adapted to engage with the respective reel in such manner that the reel is centered on the turntable and is subjected to pure tangential forces when the turntable rotates, said turntables defining a gap therebetween; and means for selectively tensioning and loosening said tape portion, said last mentioned means comprising a resilient element adapted to engage with said turntables when moved through said gap and means for reciprocating said resilient element through said gap whereby said turntables are rotated in directions to loosen said tape portion when the resilient element is reciprocated through said gap in a first direction, and the turntables are rotated in directions to tension said tape portion when the resilient element is reciprocated in a second direction.

13. In a tape recorder, in combination, a tape deck; a first and a second reel for a finite length of tape, a portion of the tape extending between said reels and the tape forming convolutions on said reels and being payed out by one reel to be taken up by the other reel when the reels rotate in one direction, and vice versa; first and second drive means for said first and second reel, respectively, each drive means comprising a rotary turntable and entraining means mounted in the turntable and adapted to engage with the respective reel in such manner that the reel is centered on the turntable and is subjected to pure tangential forces when the turntable rotates, said turntables defining a gap therebetween; and means for selectively tensioning and loosening said tape portion, said last mentioned means comprising a resilient element adapted to engage with said turntables when moved through said gap and means for reciprocating said resilient element through said gap whereby said turntables are rotated in directions to loosen said tape portion when the resilient element is reciprocated through said gap in a first direction, and the turntables are rotated in directions to tension said tape portion when the resilient element is reciprocated in a second direction, said reciprocating means comprising a rod mounting said resilient element, spring means biasing said rod and said element in one direction, and a control element engageable with and adapted to shift the rod and said resilient element in another direction.

14. In a tape recorder, in combination, a tape deck; a first and a second reel for a finite length of tape, a portion of the tape extending between said reels and the tape forming convolutions on said reels and being payed out by one reel to be taken up by the other reel when the reels rotate in one direction, and vice versa; first and second drive means for said first and second reel, respectively, each drive means comprising friction clutch means including a rotary first component, entraining means mounted in said first component and adapted to engage with the respective reel in such manner that the reel is centered on the first component and is subjected to pure tangential forces when the first component rotates, and a second component adapted to frictionally engage with and to rotate said first component, the first components of said clutch means defining a gap therebetween; and means for selectively tensioning and loosening said tape portion, said last mentioned means comprising a resilient element adapted to engage with said first components when moved through said gap, means for reciprocating said resilient element through said gap whereby said first components are rotated in directions to loosen said tape portion when the resilient element is reciprocated through said gap in a first direction, and the first components are rotated in directions to tension said tape portion when the resilient element is reciprocated through said gap in a second direction, resilient means for constantly biasing said reciprocating means and said resilient element in one of said first and second directions, and control means engageable with said reciprocating means for moving the resilient element in the other of said first and second directions.

15. In a tape recorder, in combination, a tape deck; a cartridge comprising a pair of shells defining a compartment, at least one of said shells having a pair of spaced opening means; a first and a second reel in said compartment for supporting a finite length of magnetic tape, each of said reels having a central portion received with play in one of said opening means and each of said central portions having at least one pair of diametrically opposed eccentric apertures, a portion of the tape extending between said reels and the tape forming convolutions on each said reel and being payed out by one of said reels to be taken up by the other reel when the reels rotate in one direction, and vice versa; first and second deck-mounted drive means for said first and second reel, each of said drive means comprising a rotary turntable, a pair of eccentric entraining means mounted in, adapted to project from and reciprocable in the axial direction of the respective turntable, and spring means for biasing said entraining means into the apertures of the respective reel; roller means for deflecting said tape portion, said roller means rotatably mounted in said shells and movable at least in directions at right angles to the planes of said shells; and deck-mounted bearing means for said roller means.

16. In a tape recorder, in combination, a tape deck; a cartridge comprising a pair of shells defining a compartment, at least one of said shells having a pair of spaced opening means; a first and a second reel in said compartment for supporting a finite length of magnetic tape, each of said reels having a central portion received with play in one of said opening means and each of said central portions having at least one pair of diametrically opposed eccentric apertures, a portion of the tape extending between said reels and the tape forming convolutions on each said reel and being payed out by one of said reels to be taken up by the other reel when the reels rotate in one direction, and vice versa; first and second deck-mounted drive means for said first and second reel, respectively, each drive means comprising a rotary turntable, a pair of eccentric entraining means mounted in, adapted to project from and reciprocable in the axial direction of the respective turntable, and spring means for biasing said entraining means into the apertures of the respective reel; roller means for deflecting said tape portion, said roller means rotatably mounted in said shells, having a first and a second end face, and movable at least in directions at right angles to the planes of said shells; and deck-mounted bearing means for said roller means, said bearing means comprising a first member fixed to said tape deck and adapted to engage with the first end face of said roller means, and a second member mounted on said deck and movable toward and away from said first member, said second member adapted to engage with the second end face of said roller means.

17. In a tape recorder, in combination, a tape deck; a cartridge comprising a pair of shells defining a compartment, at least one of said shells having a pair of spaced opening means; a first and a second reel in said compartment for supporting a finite length of magnetic tape, each of said reels having a central portion received with play in one of said opening means and each of said central portions having at least one pair of diametrically opposed eccentric apertures, a portion of the tape extending between said reels and the tape forming convolutions on each of said reels and being payed out by one of said reels to be taken up by the other reel when the reels rotate in one direction, and vice versa; first and second deck-mounted drive means for said first and second reel, respectively, each drive means comprising a rotary turntable, a pair of eccentric entraining means mounted in, adapted to project from and reciprocable in the axial direction of the respective turntable, and spring means for biasing said entraining means through the respective opening means and into the apertures of the respective reel; roller means for deflecting said tape portion, said roller means mounted for axial and radial movements in said shells; and deck-mounted bearing means for said roller means.

18. In a tape recorder, in combination, a tape deck; a cartridge comprising a pair of shells defining a compartment, at least one of said shells having a pair of spaced opening means; a first and a second reel in said compartment for supporting a finite length of magnetic tape, each of said reels having a central portion received with play in one of said opening means and each of said central portions having at least one pair of diametrically opposed eccentric apertures, a portion of the tape extending between said reels and the tape forming convolutions on each of said reels and being payed out by one of said reels to be taken up by the other reel when the reels rotate in one direction, and vice versa; first and second deck-mounted drive means for said first and second reel, respectively, each drive means comprising a rotary turntable, a pair of eccentric entraining means mounted in, adapted to project from and reciprocable in the axial direction of the respective turntable, and spring means for biasing said entraining means through the respective opening means and into the apertures of the respective reel; a pair of spaced rollers for deflecting said tape portion, said rollers mounted for axial and radial displacements in said shells; and deck-mounted pivot bearing means for each of said rollers, each bearing means comprising a first shaft member adjustably fixed to said tape deck and a second shaft member adjustable in directions toward and away from said first shaft member.

19. In a tape recorder, in combination, a tape deck; a cartridge comprising a pair of shells defining a compartment; a first and a second reel rotatably mounted in said shells and located in said compartment for supporting a finite length of magnetic tape, a portion of the tape extending between said reels and the tape forming convolutions on each of said reels and being payed out by one of said reels to be taken up by the other reel when the reels rotate in one direction, and vice versa, the tape having a first end, a second end and an inner side and comprising two layers of current-conducting material applied to said inner side and each adjacent to one of said tape ends; first and second deck-mounted drive means for said first and second reel, respectively, each drive means comprising entraining means adapted to engage with and to rotate the respective reel in such manner that the reel is subjected to pure tangential forces when rotated by the drive means; a first and a second roller rotatably mounted in and having at least slight freedom of axial movement with respect to said shells, each said roller engaging with the inner side of the tape and deflecting said tape portion for travel in a substantially straight path, at least one of said rollers comprising a first and a second portion of current-conducting material and a layer of insulating material between said reel portions, said first mentioned layers adapted to electrically connect said reel portions when the tape is moved from one of said reels toward the other reel, and vice versa; and pivot bearing means for each of said reels, each pivot bearing means mounted on the tape deck and engaging the respective reel in such manner that the reel floats between said shells.

20. In a tape recorder, in combination, a tape deck; a cartridge comprising a pair of shells defining a compartment; a first and a second reel rotatably mounted in said shells and located in said compartment for supporting a finite length of magnetic tape, a portion of the tape extending between said reels and the tape forming convolutions on each of said reels and being payed out by one of said reels to be taken up by the other reel when the reels rotate in one direction, and vice versa, the tape having a first end, a second end and an inner side and comprising two layers of current-conducting material applied to said inner side and each adjacent to one of said tape ends; first and second deck-mounted drive means for said first and second reel, respectively, each drive means comprising entraining means adapted to engage with and to rotate the respective reel in such manner that the reel is subjected to pure tangential forces when rotated by the drive means; a first and a second roller rotatably mounted in and having at least slight freedom of axial movement with respect to said shells, each said roller engaging with the inner side of the tape and deflecting said tape portion for travel in a substantially straight path, at least one of said rollers comprising a first and a second portion of current-conducting material and a layer of insulating material between said reel portions, said first mentioned layers adapted to electrically connect said reel portions when the tape is moved from one of said reels toward the other reel, and vice versa; and pivot bearing means for each of said reels, each pivot bearing means comprising a first shaft member adjustably fixed to said tape deck and a second shaft member movable toward and away from said first shaft member; a source of electrical energy; conductor means in the circuit of said source and connected with said first and second shaft members; and means in said circuit for reversing the direction in which said reels rotate, said shaft members engaging the respective roller in such manner that the roller floats between said shells and that one of said shaft members contacts one of said reel portions and the other shaft member contacts the other reel portion whereby the electric circuit is completed when one of said first mentioned layers contacts said reel portions.

21. In a tape recorder, in combination, a tape deck; a tape cartridge comprising a pair of shells, said shells defining between themselves a compartment and at least one thereof having a pair of spaced opening means; a pair of reels received in said compartment, each reel comprising a central portion received with at least some radial play in one of said opening means and each of said central portions having at least one pair of eccentric apertures; and deck-mounted drive means for each of said reels, each drive means comprising a rotary turntable, a pair of eccentric entraining means reciprocably supported by the respective turntable and extending through the respective opening means and into the apertures of the respective reel for transmitting rotary motion to the respective reels when the turntable rotates, and spring means operating between said entraining means and the respective turntables for biasing said entraining means into motion transmitting engagement with the respective reels, said entraining means constituting the sole means for drivingly coupling said reels to the respective turntables, said opening means and said apertures being large enough to permit automatic centering of the reels on the respective turntables when the turntables rotate so that the rotating reels are not subjected to any radial or axial forces.

22. In a tape recorder, in combination, a tape deck; a tape cartridge comprising a pair of shells, said shells defining between themselves a compartment and each thereof having a pair of spaced opening means, each opening means of one of said shells being aligned with an opening means of the other shell; a pair of reels received in said compartment, each reel comprising a central portion received with at least some radial play in a pair of aligned opening means and each of said central portions having at least one pair of eccentric apertures; and deck-mounted drive means for each of said reels, each drive means comprising a rotary turntable, a pair of eccentric entraining means reciprocably supported by the respective turntable and extending through the respective opening means of one of said shells and into the apertures of the respective reel for transmitting rotary motion to the respective reels when the turntable rotates, and spring means operating between said entraining means and the respective turntables for biasing said entraining means into motion transmitting engagement with the respective reels, said entraining means constituting the sole means for drivingly coupling said reels to the respective turntables, said opening means and said apertures being large enough to permit automatic centering of the reels on the respective turntables when the turntables rotate so that the rotating reels are not subjected to any radial or axial forces.

23. In a tape recorder, in combination, a tape deck; a tape cartridge comprising a pair of shells, said shells defining between themselves a compartment and at least one thereof having a pair of spaced opening means; a pair of reels received with at least some axial play in said compartment, each reel comprising a central portion received with at least some radial play in one of said opening means and each of said central portions having at least one pair of eccentric apertures; and deck-mounted drive means for each of said reels, each drive means comprising a rotary turntable, a pair of eccentric entraining means reciprocably supported by the respective turntable and extending through the respective opening means and into the apertures of the respective reel for transmitting rotary motion to the respective reels when the turntable rotates, and spring means operating between said entraining means and the respective turntables for biasing said entraining means into motion transmitting engagement with the respective reels, said entraining means constituting the sole means for drivingly coupling said reels to the respective turntables, said opening means and said apertures being large enough to permit automatic centering of the reels on the respective turntables when the turntables rotate so that the rotating reels are not subjected to any radial or axial forces.

24. In a tape recorder, in combination, a tape deck; a tape cartridge comprising a pair of shells, said shells defining between themselves a compartment and at least one thereof having a pair of spaced opening means; a pair of reels received in said compartment, each reel comprising a central portion received with at least some radial play in one of said opening means and each of said central portions having at least one pair of eccentric apertures; and deck-mounted drive means for each of said reels, each drive means comprising a rotary turntable, a pair of eccentric entraining pins reciprocably supported by the respective turntable and extending through the respective opening means and into the apertures of the respective reel for transmitting rotary motion to the respective reels when the turntable rotates, and spring means operating between said pins and the respective turntables for biasing the pins into motion transmitting engagement with the respective reels, said pins constituting the sole means for drivingly coupling said reels to the respective turntables and disposed at diametrically opposite sides of the axes of the respective turntables, said opening means and said apertures being large enough to permit automatic centering of the reels on the respective turntables when the turntables rotate so that the rotating reels are not subjected to any radial or axial forces.

References Cited in the file of this patent

UNITED STATES PATENTS

| | | |
|---|---|---|
| 2,022,353 | Kindelmann et al. | Nov. 26, 1935 |
| 2,612,565 | Heller | Sept. 30, 1952 |
| 2,645,495 | Nelson | July 14, 1953 |
| 2,659,541 | Camras | Nov. 17, 1953 |
| 2,661,162 | Owens | Dec. 1, 1953 |
| 3,027,111 | Redfield | Mar. 27, 1962 |